(12) United States Patent
Nedved et al.

(10) Patent No.: US 12,359,954 B2
(45) Date of Patent: Jul. 15, 2025

(54) SEEDING SYSTEM

(71) Applicant: DEERE & COMPANY, Moline, IL (US)

(72) Inventors: Peter R. Nedved, Coal Valley, IL (US); Terry L. Snipes, East Moline, IL (US); John M. Schweitzer, Ankeny, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 18/587,469

(22) Filed: Feb. 26, 2024

(65) Prior Publication Data
US 2024/0377237 A1    Nov. 14, 2024

Related U.S. Application Data

(60) Continuation of application No. 17/196,585, filed on Mar. 9, 2021, now Pat. No. 11,933,651, which is a
(Continued)

(51) Int. Cl.
*G01F 13/00* (2006.01)
*A01C 7/06* (2006.01)
(Continued)

(52) U.S. Cl.
CPC ............ *G01F 13/001* (2013.01); *A01C 7/06* (2013.01); *A01C 7/082* (2013.01); *A01C 7/084* (2013.01); *A01C 7/205* (2013.01); *A01C 15/006* (2013.01)

(58) Field of Classification Search
CPC ......... G01F 13/001; G01F 13/00; A01C 7/06; A01C 7/082; A01C 7/084; A01C 7/205;
(Continued)

(56) References Cited

U.S. PATENT DOCUMENTS

| 4,638,748 A | 1/1987 | Kopecky |
| 4,767,062 A | 8/1988 | Fletcher |

(Continued)

FOREIGN PATENT DOCUMENTS

| AU | 2016222360 A1 | 4/2017 |
| CA | 2741267 A1 | 11/2012 |

(Continued)

OTHER PUBLICATIONS

Office Action from the US Patent and Trademark Office for U.S. Appl. No. 14/871,515 dated Jan. 27, 2017 (13 pages).
(Continued)

*Primary Examiner* — Christopher J. Novosad
(74) *Attorney, Agent, or Firm* — Michael Best & Friedrich LLP

(57) ABSTRACT

A seeding system includes a commodity tank configured to store a commodity, the commodity tank having an outlet. A meter has a meter inlet at the outlet of the commodity tank, a meter outlet, and a metering device between the meter inlet and the meter outlet. A manifold has a commodity inlet at the meter outlet, a first shoot having a first air inlet and a first manifold outlet, and a second shoot having a second air inlet and a second manifold outlet. A valve is positioned upstream of the first and second air inlets and configured to selectively direct an airflow to the first air inlet and to selectively direct the airflow to the second air inlet. Each of the first shoot and the second shoot are in selective communication with the commodity inlet to receive the commodity therefrom.

20 Claims, 7 Drawing Sheets

Related U.S. Application Data division of application No. 15/979,027, filed on May 14, 2018, now Pat. No. 10,942,053.

(51) Int. Cl.
*A01C 7/08* (2006.01)
*A01C 7/20* (2006.01)
*A01C 15/00* (2006.01)

(58) Field of Classification Search
CPC ......... A01C 15/006; A01C 7/00; A01C 7/081; A01C 7/08; A01C 7/201; A01C 7/20; A01C 15/005; A01C 15/00
See application file for complete search history.

(56) References Cited

U.S. PATENT DOCUMENTS

| | | | |
|---|---|---|---|
| 4,779,765 A | 10/1988 | Neumeyer | |
| 4,793,742 A | 12/1988 | Strand | |
| 4,852,809 A | 8/1989 | Davis et al. | |
| 5,351,635 A | 10/1994 | Hulicsko | |
| 5,379,706 A | 1/1995 | Gage et al. | |
| 5,650,609 A | 7/1997 | Mertins | |
| 5,826,523 A | 10/1998 | Gregor | |
| 5,878,679 A | 3/1999 | Gregor et al. | |
| 6,186,083 B1 | 2/2001 | Toto | |
| 6,192,813 B1 | 2/2001 | Memory et al. | |
| 6,213,690 B1 | 4/2001 | Gregor et al. | |
| 6,283,679 B1 | 9/2001 | Gregor et al. | |
| 6,609,468 B1 | 8/2003 | Meyer et al. | |
| 6,688,244 B1 | 2/2004 | Mayer et al. | |
| 6,935,255 B2 | 8/2005 | Hagen et al. | |
| 6,935,256 B1 | 8/2005 | Meyer | |
| 7,093,547 B2 | 8/2006 | Mayerle | |
| 7,353,760 B2 | 4/2008 | Mayerle et al. | |
| 7,509,915 B2 | 3/2009 | Memory | |
| 7,555,990 B2 | 7/2009 | Beaujot | |
| 7,743,719 B2 | 6/2010 | Memory | |
| 7,765,943 B2 | 8/2010 | Landphair | |
| 7,938,075 B1 | 5/2011 | Glendenning et al. | |
| 8,132,521 B2 | 3/2012 | Snipes et al. | |
| 8,281,724 B2 | 10/2012 | Snipes | |
| 8,350,689 B2 | 1/2013 | Mariman et al. | |
| 8,666,608 B2 | 3/2014 | Friggstad | |
| 9,043,949 B2 | 6/2015 | Liu et al. | |
| 9,488,512 B2 | 11/2016 | Hossain et al. | |
| 9,546,051 B2 | 1/2017 | Roberge et al. | |
| 9,596,803 B2 | 3/2017 | Wendte et al. | |
| 9,648,801 B2 | 5/2017 | Borkgren et al. | |
| 9,699,953 B2 | 7/2017 | Jagow et al. | |
| 9,814,173 B2 | 11/2017 | Frasier et al. | |
| 9,872,427 B2 | 1/2018 | Thompson et al. | |
| 10,942,053 B2 | 3/2021 | Nedved et al. | |
| 11,933,651 B2 | 3/2024 | Nedved et al. | |
| 2003/0133759 A1 | 7/2003 | Winther | |
| 2004/0163578 A1 | 8/2004 | Mcdonald et al. | |
| 2004/0206283 A1 | 10/2004 | Mayerle | |
| 2005/0103244 A1 | 5/2005 | Mayerle et al. | |
| 2005/0172873 A1 | 8/2005 | Mayerle | |
| 2005/0235889 A1 | 10/2005 | Martin et al. | |
| 2005/0247806 A1 | 11/2005 | Meyer et al. | |
| 2006/0042529 A1 | 3/2006 | Johnson et al. | |
| 2007/0266917 A1 | 11/2007 | Riewerts et al. | |
| 2009/0079624 A1 | 3/2009 | Dean et al. | |
| 2011/0035163 A1 | 2/2011 | Landphair | |
| 2012/0103238 A1 | 5/2012 | Beaujot et al. | |
| 2012/0211508 A1 | 8/2012 | Barsi et al. | |
| 2012/0226461 A1 | 9/2012 | Kowalchuk | |
| 2012/0325130 A1 | 12/2012 | Kowalchuk | |
| 2014/0165890 A1 | 6/2014 | Graham | |
| 2014/0190376 A1 | 7/2014 | Johnson et al. | |
| 2014/0193215 A1 | 7/2014 | Connors et al. | |
| 2014/0216314 A1 | 8/2014 | Bourgault et al. | |
| 2014/0311598 A1 | 10/2014 | Hui et al. | |
| 2015/0090166 A1 | 4/2015 | Allgaier et al. | |
| 2015/0112556 A1 | 4/2015 | Meyer zu Hoberge et al. | |
| 2015/0223392 A1 | 8/2015 | Wilhelmi et al. | |
| 2016/0037713 A1 | 2/2016 | Wendte et al. | |
| 2016/0050843 A1 | 2/2016 | Roberge et al. | |
| 2016/0088791 A1 | 3/2016 | Horsch | |
| 2016/0095274 A1 | 4/2016 | Wendte et al. | |
| 2016/0120102 A1 | 5/2016 | Roberge et al. | |
| 2016/0120107 A1 | 5/2016 | Chahley et al. | |
| 2016/0121284 A1 | 5/2016 | Roberge et al. | |
| 2016/0135359 A1 | 5/2016 | Kowalchuk et al. | |
| 2016/0157417 A1 | 6/2016 | Funck | |
| 2016/0234996 A1 | 8/2016 | Sauder et al. | |
| 2016/0295792 A1 | 10/2016 | Secrest et al. | |
| 2016/0302353 A1 | 10/2016 | Wendte et al. | |
| 2017/0086351 A1 | 3/2017 | Garner et al. | |
| 2017/0086352 A1 | 3/2017 | Frasier et al. | |
| 2017/0086355 A1 | 3/2017 | Borkgren et al. | |
| 2017/0086356 A1 | 3/2017 | Schweitzer et al. | |
| 2017/0127605 A1 | 5/2017 | Roberge et al. | |
| 2017/0156259 A1 | 6/2017 | Barsi et al. | |
| 2018/0124998 A1 | 5/2018 | Swanson et al. | |

FOREIGN PATENT DOCUMENTS

| | | |
|---|---|---|
| DE | 8416161 U1 | 9/1985 |
| DE | 102014115020 A1 | 4/2015 |
| EP | 1560157 A2 | 8/2005 |
| EP | 1591000 A1 | 11/2005 |
| EP | 2196079 A1 | 6/2010 |
| EP | 2708105 A2 | 3/2014 |
| EP | 2765398 A1 | 8/2014 |
| EP | 3000299 A1 | 3/2016 |
| EP | 3235361 A1 | 10/2017 |
| FR | 2973790 A1 | 10/2012 |
| SU | 759063 A1 | 8/1980 |
| WO | 2004017712 A1 | 3/2004 |
| WO | 2013180619 A1 | 12/2013 |
| WO | 2015094108 A1 | 6/2015 |

OTHER PUBLICATIONS

Office Action from the US Patent and Trademark Office for U.S. Appl. No. 14/871,515 dated May 10, 2017 (5 pages).
Office Action from the US Patent and Trademark Office for U.S. Appl. No. 14/871,633 dated Jan. 19, 2017 (13 pages).
Office Action from the US Patent and Trademark Office for U.S. Appl. No. 14/871,633 dated Jul. 6, 2017 (14 pages).
Office Action from the US Patent and Trademark Office for U.S. Appl. No. 14/871,653 dated Jan. 31, 2017 (13 pages).
Office Action from the US Patent and Trademark Office for U.S. Appl. No. 14/871,653 dated Jul. 17, 2017 (5 pages).
EP16190733.2 Extended European Search Report dated Feb. 2, 2017 (9 pages).
Office Action from the US Patent and Trademark Office for U.S. Appl. No. 15/290,345 dated Jan. 17, 2018 (12 pages).
Office Action from the US Patent and Trademark Office for U.S. Appl. No. 14/871,515 dated Oct. 24, 2017 (13 pages).
German Patent Office Search Report for Application No. 102017216623.1 dated Aug. 29, 2018 (11 pages, statement of relevance included).
United States Patent Office Action for U.S. Appl. No. 15/290,345 dated Mar. 6, 2019 (10 pages).
German Patent Office Search Report for Application No. 102016218258.7 dated Apr. 24, 2019 (11 pages, statement of relevance included).
Examination Report No. 1 issued by the Australian Government for Application No. 2016222360 dated Jul. 14, 2020 (6 pages).
Australian Examination & Search Report issued in Australian Patent Application No. 2017225170 dated Jul. 27, 2022, in 13 pages.
Australian Patent Office Examination Report for Application No. 2019202564 dated Apr. 30, 2024 (5 pages).

SEEDING SYSTEM

CROSS-REFERENCE TO RELATED APPLICATIONS

The application is a continuation of U.S. patent application Ser. No. 17/196,585 filed Mar. 9, 2021, which is a divisional of U.S. patent application Ser. No. 15/979,027 filed May 14, 2018, now U.S. Pat. No. 10,942,053 the entire contents of which are incorporated by reference.

BACKGROUND

The present disclosure relates to a seeding and planting system and more particularly to a metering and distribution system of the seeding and planting system.

SUMMARY

Current seeding practices tend to involve one of two types of seeding systems: planters and air seeders. Planters generally singulate or individually meter seeds prior to planting and are typically used to disperse seeds where precise placement is required for maximum yield and the seeding rate permits use of singulating technologies. Air seeders generally meter seeds volumetrically and are typically used in high rate seeding applications and where precise seed placement is of less importance or not practical due to the high rates.

In one embodiment, a seeding system includes a commodity tank configured to store a commodity. The commodity tank has a first outlet and a second outlet. A volumetric meter has a meter inlet at the first outlet of the commodity tank, a meter outlet, and a metering device between the meter inlet and the meter outlet. A manifold has a commodity inlet at the meter outlet of the volumetric meter, an air inlet, and a manifold outlet. A first dispersion device having a plurality of outlets and an inlet in communication with the manifold outlet. A second dispersion device has a plurality of outlets and an inlet in communication with the second outlet of the commodity tank. The second outlet of the commodity tank bypasses the volumetric meter.

In another embodiment, a seeding system having a commodity tank configured to store a commodity. The commodity tank has an outlet. A meter has a meter inlet at the outlet of the commodity tank, a meter outlet, and a metering device between the meter inlet and the meter outlet. A manifold has a commodity inlet at the meter outlet, a first shoot having a first air inlet and a first manifold outlet, and a second shoot having a second air inlet and a second manifold outlet. A valve is positioned upstream of the first and second air inlets and configured to direct an airflow to one of the first air inlet or the second air inlet. Each of the first shoot and the second shoot are in selective communication with the commodity inlet to receive the commodity therefrom.

In yet another embodiment, an air distribution manifold for dispensing product into an airstream includes a manifold housing defining a commodity inlet, a first shoot having a first air inlet, a first manifold outlet and a first passageway extending therebetween, and a second shoot having a second air inlet, a second manifold outlet and a second passageway extending therebetween. The second passageway includes a container configured to hold the commodity, a first portion extending downward from the second air inlet to the container and a second portion extending upward from the container to the second manifold outlet.

Other features and aspects of the disclosure will become apparent by consideration of the following detailed description and accompanying drawings.

Before any embodiments of the disclosure are explained in detail, it is to be understood that the disclosure is not limited in its application to the details of construction and the arrangement of components set forth in the following description or illustrated in the following drawings. The disclosure is capable of supporting other embodiments and of being practiced or of being carried out in various ways. Also, it is to be understood that the phraseology and terminology used herein is for the purpose of description and should not be regarded as limiting.

DETAILED DESCRIPTION

Figure 1:
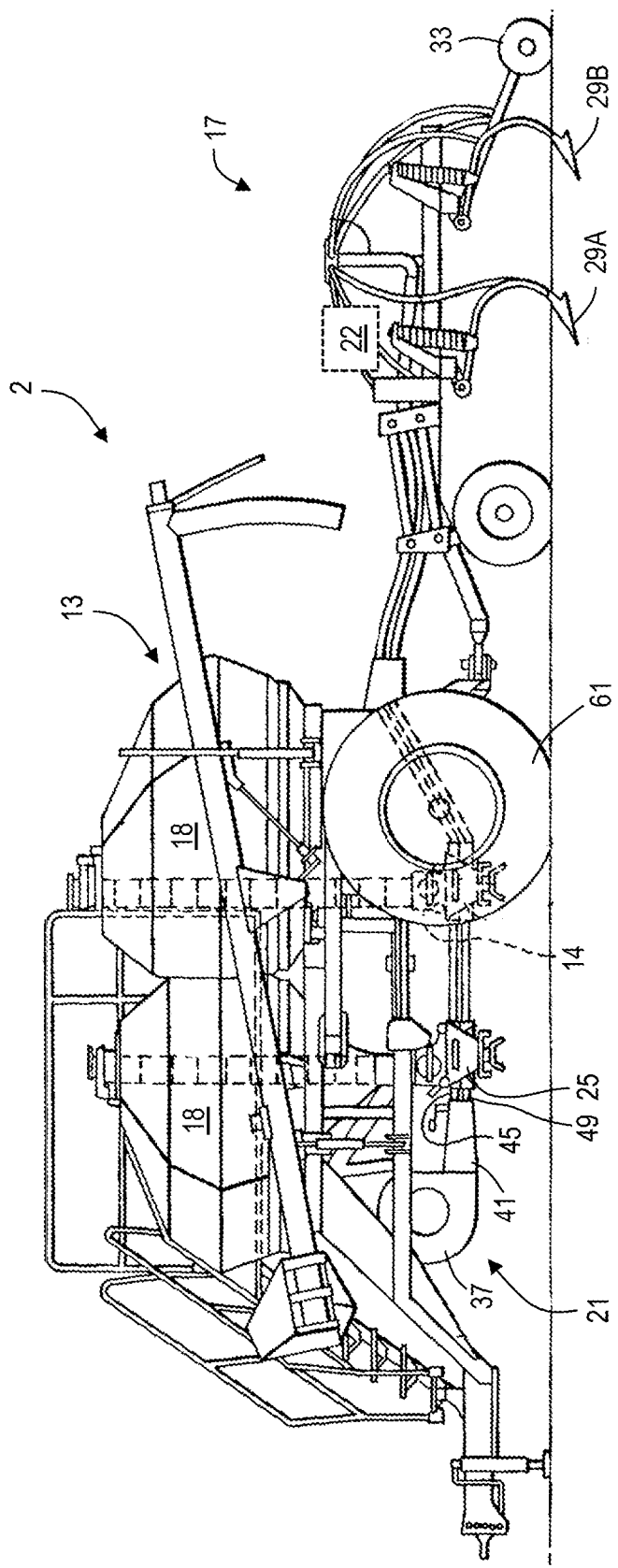
FIG. 1 is a side view of a seeder.

As shown in FIG. 1, seeding machine 2 comprises a seed cart 13 and a tilling implement 17. The seed cart 13 is typically towed by a tractor through a field to be seeded. The seed cart 13 has a frame supporting a number of storage tanks 18 with wheels 61 rotatably mounted to the frame. The product contained in the storage tanks 18 may include seed, fertilizer, or other agricultural particles. Each storage tank 18 is provided with a volumetric meter 14. Each volumetric meter 14 is positioned below the respective storage tank 18 and receives product therefrom for controlled feeding of the product into a pneumatic distribution system 21.

The tilling implement 17, towed behind the seed cart 13, comprises a frame to which ground openers 29A, 29B are mounted. The tilling implement 17 may also include seed row finishing equipment such as packers 33. Located below each volumetric meter 14 is a primary air distribution manifold 25, part of the pneumatic distribution system 21. The pneumatic distribution system 21 distributes metered product from the storage tanks 18 through shoots and to a rank associated with one of the ground openers 29A, 29B. The pneumatic distribution system 21 comprises a blower or fan 37 driven by a motor which directs a stream of pressurized air through an adjustable damper 41, which thereafter directs the air stream into a top shoot portion directed into an upper shoot of first tubes 45 and a bottom shoot portion directed into a bottom shoot of first tubes 49. FIG. 1 illustrates a double shoot air seeder wherein a first product contained in one of the storage tanks 18 is directed to the top shoot portion 45 of the air stream and the second product contained in the other of the storage tanks 18 is directed to the bottom shoot portion 49 of the air stream. Triple shot applications in which three products are added to three different shoot portions of the air stream are also utilized in certain situations, as shown in FIG. 2.

Figure 2:
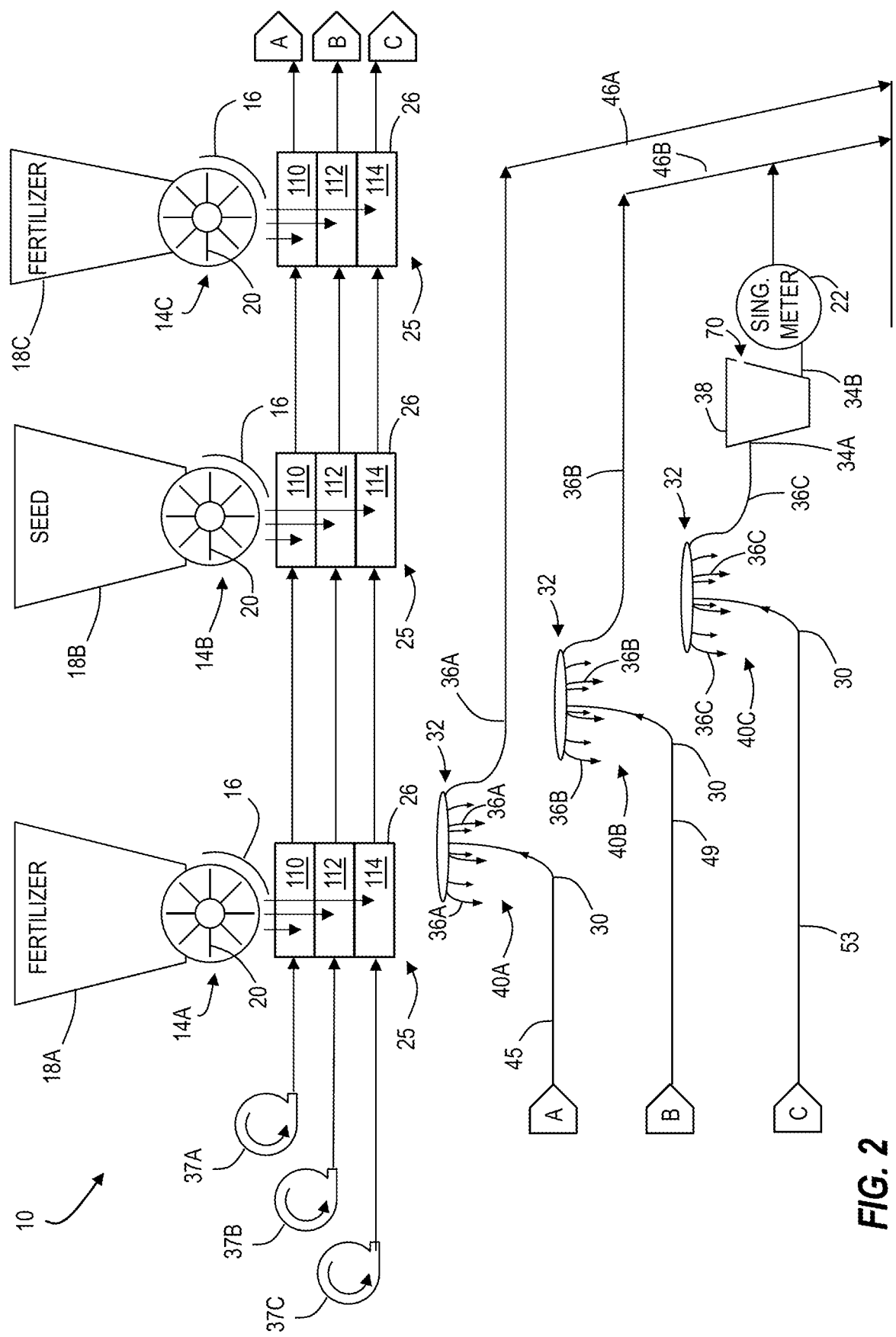
FIG. 2 is a schematic diagram illustrating a metering and distribution system having three shoots.

FIG. 2 schematically illustrates a seed metering system 10 along three shoot portions or main conduits 45, 49, 53 for use in a planting operation, such as seeding a field or dispersing agricultural particles (e.g., fertilizer, etc.). The seed metering system 10 can be used with or as a part of the seeding machine 2.

Each volumetric meter 14A, 14B, 14C (e.g., one volumetric meter 14A, 14B, 14C associated with each of the three commodity or storage tanks 18A, 18B, and 18C, respectively) is configured to receive and meter the commodity (i.e., seeds, fertilizer, or other agricultural particles) from the storage tanks 18A, 18B, and 18C. The storage tanks 18A, 18B, 18C may be in the form of a tank, hopper, air cart, mobile seed storage device, or other bulk container as previously described and illustrated in FIG. 1. Further, while three storage tanks 18A, 18B, 18C are shown, more or less tanks 18 may be located on the seed cart 13. As shown, the three storage tanks 18A, 18B, 18C may be sized differently and may be used for different purposes based on the desired result. For example, a smaller tank (such as tank 18C) may be used for smaller seeds such as canola. On the other hand, larger tanks (such as tank 18B) may be used for larger seeds or seeds that require greater volumetric rates of seeding. Each of the tanks 18A, 18B, 18C is configured to provide the commodity to one of the three conduits or shoots 45, 49, 53 via an air distribution manifold 25 and the respective volumetric meter 14A, 14B, 14C.

The volumetric meters 14A, 14B, 14C control the amount or volume of seeds or other agricultural particles permitted to exit the storage tanks 18A, 18B, 18C over a set period of time and may each include multiple roller segments or rotating members 20, each capable of rotating at a constant rotational velocity along a common shaft. The volumetric meters 14A, 14B, 14C are located upstream of and are operable to provide a known, constant volume of seeds or particles to the conduits 45, 49, 53 via the manifolds 25. Gates 16 associated with each volumetric meter 14A, 14B, 14C or each roller segment 20 are operable to open or close to vary the amount of seeds or agricultural particles which reach the manifold 25 and the conduits 45, 49, 53. Alternatively, each roller segment 20 of the volumetric meters 14A, 14B, 14C may be individually driven, and therefore may be individually halted to vary the amount of seeds or agricultural particles which reach the manifold 25.

The manifold 25 is a structure located at the base of each volumetric meter 14A, 14B, 14C, the structure having a manifold housing 26. The manifold housing 26 defines three passageways (per roller segment 20) extending therethrough, a first passageway 110 associated with the upper shoot 45, a second passageway 112 associated with the middle shoot 49, and a third passageway 114 associated with the lower shoot 53. As each volumetric meter 14A, 14B, 14C may include a plurality of roller segments 20 (i.e., extending into the page of FIG. 2), the manifold housing 26 defines a plurality of first, second, and third passageways 110, 112, 114 extending into the page. For simplicity, reference will be made to the passageways 110, 112, 114 of a single meter roller segment 20.

Each commodity tank 18A, 18B, 18C includes a similar manifold 25, except as described below (e.g., FIGS. 5-7). In some embodiments, the seed metering system 10 may include only two shoot portions 45, 49 (an upper shoot and a lower shoot) and the manifold would only define two passageways 110, 112. It is to be understood that the terms "upper," "middle," and "lower" are used as a naming convention to differentiate the placement of the shoots 45, 49, 53 within the figures, and they may be reordered except as otherwise described. The manifold 25 includes a gate having gate elements (similar to gate elements 124, 126, 128 shown in FIG. 6) extending between the various passageways 110, 112, 114. The gate elements 124, 126, 128 may be formed as a single component or multiple components that move with one another or relative to one another to direct the flow of the commodity. When a first gate element 124 is in a first position, it directs the commodity to the first passageway 110. When the first gate element 124 is in a second position, a second gate element 126 is in a first position and the two gate elements 124, 126 collectively direct the commodity around the first passageway 110 and to the second passageway 112. With a third shoot 53, the second gate element 126 is switchable from the first position to a second position and a third gate element 128 is in a first position to direct the commodity past the second passageway 112 to the third passageway 114. Once within the desired passageway 110, 112, 114, an airflow or air current moves the commodity through the conduit 45, 49, 53. An example of such a system is described in U.S. Pat. No. 6,213,690 assigned to Deere and Co., the entire contents of which are herein incorporated by reference.

A fan 37A, 37B, 37C is located at one end of the conduits 45, 49, 53 and is operable to provide the air current to the corresponding conduits 45, 49, 53 and throughout the remainder of the metering system 10. As shown, the first conduit 45 utilizes a first fan 37A, the second conduit utilizes a second fan 37B, and the third conduit 53 utilizes a third fan 37C. Alternatively, a single fan may provide air currents to multiple ones of the conduits 45, 49, 53.

The main conduits 45, 49, 53 terminate at distribution or dispersion devices or units 40A, 40B, 40C which are located between the volumetric meter 14A, 14B, 14C and the ground, where the seeds or particles are deposited. The dispersion units 40A, 40B, 40C as shown each have an inlet 30 coupled to the respective main conduit 45, 49, 53 a collection volume, and a plurality of outlets 32, which lead to secondary conduits 36A, 36B, 36C. Each secondary conduit 36A, 36B, 36C leads to an outlet conduit 46A, 46B. As the seeds or agricultural particles from a single conduit (i.e., the conduit 45, 49, 53) are dispersed among multiple conduits (i.e., the secondary conduits 36A, 36B, 36C), the secondary conduits 36A, 36B, 36C may be of lesser size or area than the associated conduits 45, 49, 53.

While the commodities (i.e., seeds, fertilizer, and other agricultural particles) in the upper and middle shoots 49, 45 are not further metered (i.e., after the volumetric meters 14A, 14B, 14C), any seeds in the lower shoot 53 are further metered by a singulating meter 22. Each secondary conduit 36C extends from the dispersion unit 40C to a mini-hopper 38. The mini-hopper 38 receives seeds from the third dispersion unit 40C via the secondary conduit 36C. The mini-hopper 38 is located directly upstream of the singulating meter 22 and feeds the seeds from the secondary conduit 36C into the meter 22. The mini-hopper 38 is additionally capable of storing excess seeds, not yet metered by the singulating meter 22. Therefore, the seeds may pass through the volumetric meter 14C at a greater rate than the seeds are singulated through the singulating meters 22. This ensures that the singulating meter 22 is consistently stocked with seeds for singulating and subsequently planting. The mini-hopper 38 may be gravity-assisted, with an inlet 34A from the secondary conduit 36C located at a height above the outlet 34B to the singulating meter 22. At the height of the inlet 34A or at a height between the inlet 34A and the outlet 34B, the mini-hopper 38 is provided with one or more openings 70. The openings 70 are sized smaller than the seeds such that seeds are not capable of traversing the openings 70. When not blocked by seeds, the openings 70 serve as an outlet for the air from the fan 37B through the conduit 36C.

The singulating meter 22 is operable to singulate or individually meter seeds and is in communication with the mini-hopper 38 via the mini-hopper outlet 34B. The singulating meter 22 may include a rotating singulating disk (not shown) with multiple orifices, each sized to accept a single seed, and a doubles eliminator (not shown) provided to ensure a one-to-one ratio of seed to each aperture.

At an outlet end, the singulating meter 22 is connected to the conduit 46B. A seed sensor (not shown) may be positioned at the outlet of the singulating meter 22 to measure or calculate the number of seeds or rate of seeding (i.e., number of seeds per time increment) from the singulating meter 22 and the bypass conduit 26 around the singulating meter 22. This information can be stored and relayed from a control unit to an operator for quality assurance. The conduit 46B provides a path for the singulated seeds to reach the ground and may be in the form of a tube, hollow shaft, channel, belt, or similar means of conveyance suitable to transfer seed, fertilizer, or other agricultural particles to the ground. More specifically, the conduit 46B may deposit or plant the seeds in a furrow created by one of the ground openers 29A (FIG. 1), such as a seed shank. In other constructions, the opener may include one or two opener disks 29B.

In operation, the fertilizer in the first tank 18A is volumetrically metered via the roller segments 20 of the meter 14A and to, for example, the first passageway 110 of the manifold. Airflow from the first fan 37A carries the fertilizer through the first shoot 45 and to the dispersion unit 40A where the fertilizer is divided into multiple secondary conduits 36A. From the secondary conduits 36A, the fertilizer is provided to the ground via the outlet conduit 46A.

The seeds in the second tank 18B are volumetrically metered via the roller segments 20 of the meter 14B and may be directed to the second passageway 112 or the third passageway 114. If the seeds are directed to the second passageway 112, airflow from the second fan 37B carries the seeds through the second shoot 49 and to the dispersion unit 40B where the seeds are divided into multiple secondary conduits 36B. From the secondary conduits 36B, the seeds are provided to the ground via the outlet conduit 46B.

If the seeds are directed to the third passageway 114, airflow from the third fan 37C carries the seeds through the third shoot 53 and to the dispersion unit 40C where the seeds are divided into multiple secondary conduits 36C. From the secondary conduits 36C, the seeds are provided to the mini-hopper 38. The singulating meter 22 singulates the seeds to precisely carry single seeds at a predetermined rate from the mini-hopper 38 to the outlet conduit 46B, and from the outlet conduit 46B to the ground.

Fertilizer in the third tank may be directed to the second passageway 112 of the manifold 25, thereby following the path taken by the seeds in the second shoot 49, as described above.

Figure 3:
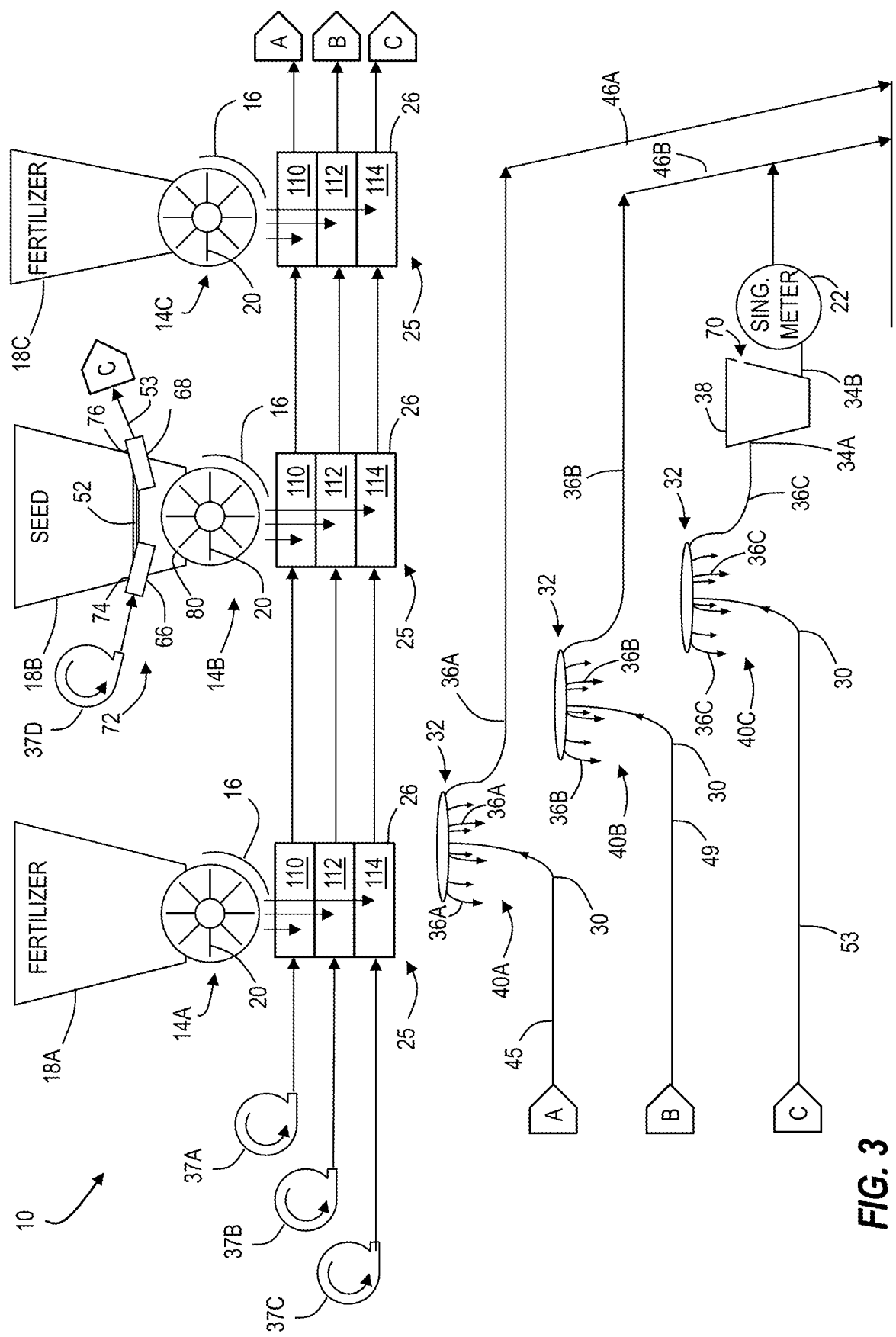
FIG. 3 is a schematic diagram illustrating a metering and distribution system having a metering system in a commodity tank.

FIG. 3 illustrates a modified seeding system 10. As shown in FIG. 3, the second commodity tank 18B (or another tank containing seeds) may be provided directly with a seed-on-demand distribution system 72. The distribution system 72 is mounted within the commodity tank 18B and extends between an inlet 74 and an outlet 76 of the tank 18B. The inlet 74 and the outlet 76 are formed in the sidewalls of the commodity tank 18B. A fan 37D is positioned upstream of the inlet 74 to provide an airflow through the inlet 74 and into the commodity tank 18B. The distribution system 72 includes a structure between the inlet 74 and the outlet 76 and positioned within the commodity tank 18B. The structure is defined by a downward extending inlet tube 66 (i.e., extending downward from the inlet at the sidewall), an upward extending outlet tube 68 (i.e., extending upward toward the outlet at the sidewall), and a bridge 52 connecting the inlet tube 66 and the outlet tube 68. The inlet tube 66 is mounted at the inlet 72 of the commodity tank 18B and the outlet tube 68 is mounted at the outlet 74 of the commodity tank 18B. The bridge 52 is a structure that spans above the inlet tube 66 and the outlet tube 68 to provide a sheltered region between the inlet and outlet tubes 66, 68 and below the bridge 52. The bridge 52 prevents or limits the weight of the seeds above the bridge 52 from applying a force on the seeds within the sheltered region. The outlet 76 of the distribution system 72 provides the seeds directly or indirectly to the dispersion unit 40C.

Although the manifolds 25 in FIG. 3 are shown with three shoots 45, 49, 53, the manifolds 25 may otherwise be formed of two shoots 45, 49, such that the only path to the third dispersion unit 40C is through the seed-on-demand distribution system 72.

With the inclusion of the seed-on-demand distribution system 72 in the commodity tank 18B, the commodity tank 18B includes two distinct outlets 76, 80 for the seeds. The first outlet 80 directs the seeds through the volumetric meter 14B and to the manifold 25. The second outlet 76 is positioned upstream of the first outlet 80 such that seeds that pass through the second outlet 76 are not volumetrically metered, but are instead selectively picked up by the airflow generated by the fan 37D based on the air pressure in the conduit 53, and more specifically based on the air pressure in the various secondary conduits 36C. In this way, seeds passing through the second outlet 76 exit the commodity tank 18B, bypassing the volumetric meter 14B.

When it is desired to singulate seeds via the singulating meter 22, the volumetric meter 14B at the respective tank 18B is not used such that seeds do not exit the commodity tank 18B through the first outlet 80. Instead, the seeds are provided through the second outlet 76 at the seed-on-demand distribution system 72. An airflow path from the seed outlet 76 of the distribution device 72 extends from the seed outlet 76, through the third shoot 53, and to multiple secondary conduits 36C and mini-hoppers 38 via the distribution device 40C. The airflow path terminates at the opening 70 in the mini-hopper, through which air flows to the environment. When the opening 70 is covered by seeds within the mini-hopper 38, the airflow entering the mini-hopper 38 lacks an outlet, thereby building up pressure within the respective secondary line 36C. This prevents seeds from entering a full mini-hopper 38. When all of the mini-hoppers 38 (the mini-hoppers associated with each of the secondary conduits 36C) are full or at a predetermined fill limit, the pressure built up into the primary conduit or shoot 53 prevents seeds from exiting the commodity tank 36C at the second outlet 76. A pressure sensor (not shown) may be positioned in the primary conduit 53 to measure the air pressure therein. A controller may selectively turn off the fan 37D in response to a high pressure threshold indicating that the mini-hoppers 38 are full or at the predetermined fill limit.

Figure 4:
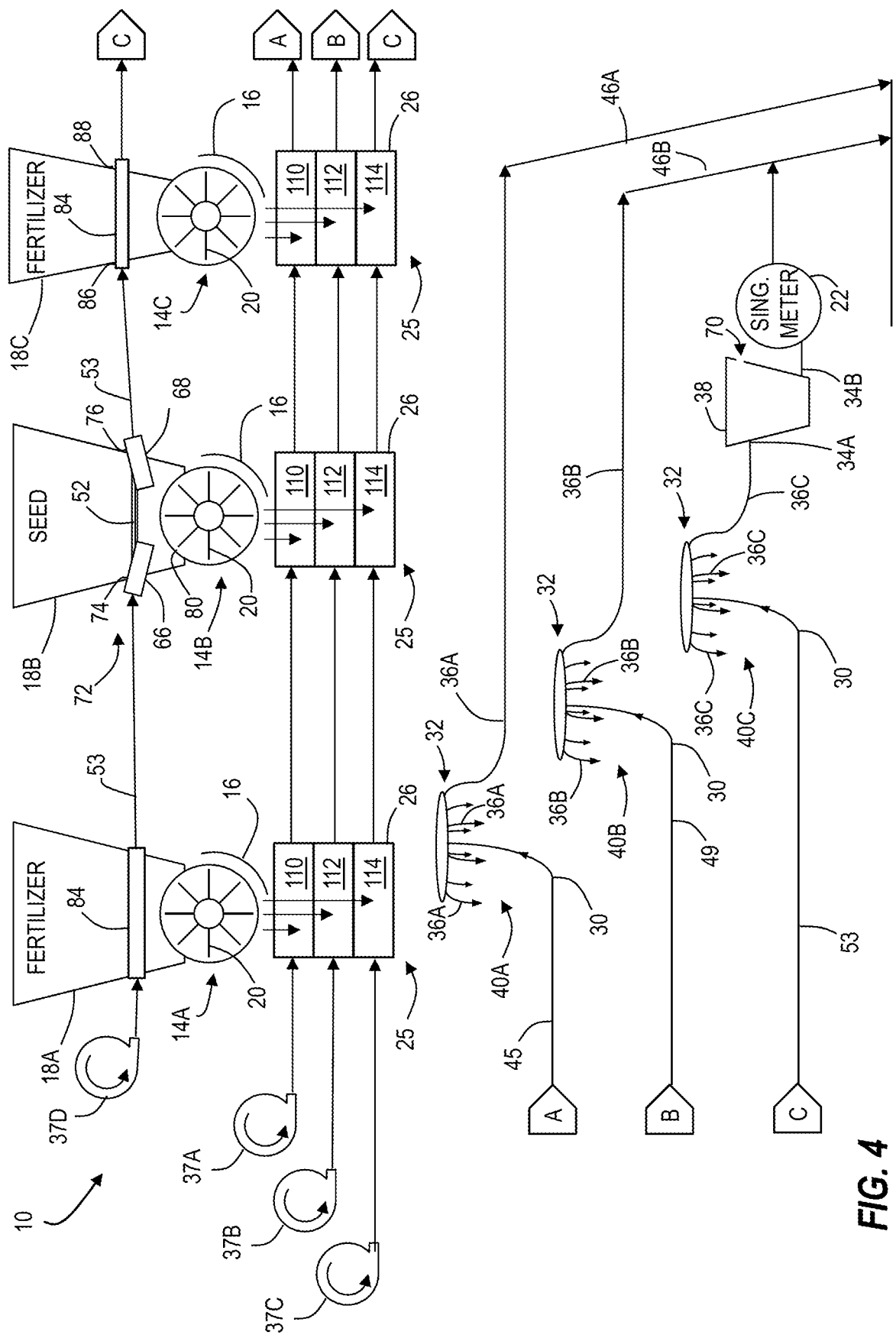
FIG. 4 is a schematic diagram illustrating a metering and distribution system having the metering system in the commodity tank and a pass through in a second commodity tank.

The seed-on-demand distribution system 72 may be otherwise or additionally provided on other tanks such as the first tank 18A and/or the third tank 18C. As shown in FIG. 4, each commodity tank 18A, 18B, 18C, or at least some of the first, second, and third commodity tanks 18A, 18B, 18C may be provided with inlets and outlets that are capable of supporting the seed-on-demand distribution system 72. As shown, the seed-on-demand distribution system 72 of FIG. 3 is likewise shown in FIG. 4, though the outlet (conduit 53 located directly downstream the outlet tube 68) of the distribution system 72 is routed through the third tank 18C, and more specifically through a channel or pass-through 84 in the third tank 18C. With respect to the third tank 18C, the pass-through 84 is a tube that extends from the inlet 86 of the third tank 18C to the outlet 88 of the third tank 18C without any metering occurring therein. The pass-through 72 is a closed tube that prevents the commodity in the respective tank (in this instance tank 18C, though also applying to tank 18A) from entering either the inlet 86 or the outlet 88 of the tank 18C. The commodity in the tank 18C can pass around the pass-through 84 to the volumetric meter 14C positioned below.

The seed-on-demand distribution system 72 and the pass-through 84 shown in FIG. 4 can be removable from the tanks 18A, 18B, 18C and switchable such that, for example, the third tank 18C is provided with the seed-on-demand distribution system 72 and the second tank 18B is provided with the pass-through 84. Therefore, the structure adjacent the tanks (i.e., the conduit from the fan 37D to the inlet of the second tank 18B, the conduit 53 between the outlet 76 of the second tank 18B and the inlet 86 of the third tank 18C, and the conduit 53 from the outlet 88 of the third tank 18C) can remain in place regardless of which tank 18B, 18C utilizes the seed-on-demand distribution system 72. The operation of the seed-on-demand distribution system 72 shown in FIG. 4 is similar to that described with respect to FIG. 3, though the seeds sent through the outlet 76 of the second tank 18B are routed through the pass-through 84 of the third tank 18C before continuing to the distribution system 40C.

All seed-on-demand distribution systems can be replaced by pass-through conduits 84 when there is no desire to singulate the commodity in any tank 18A, 18B, 18C. Alternatively or additionally, the fan 37D can be turned off in this situation.

Figure 5:
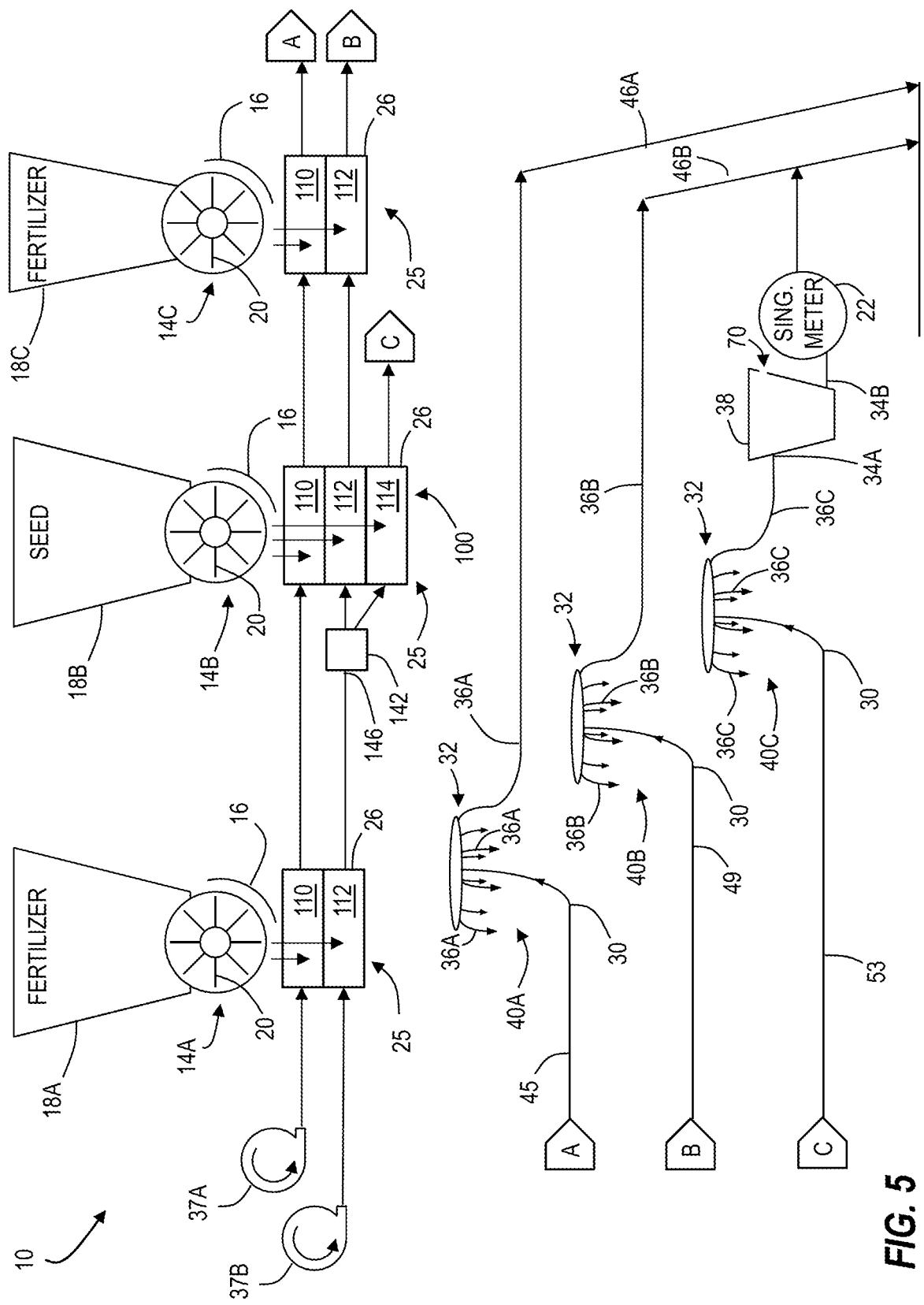
FIG. 5 is a schematic diagram illustrating a metering and distribution system having a manifold with a seed-on-demand system.
Figure 6:
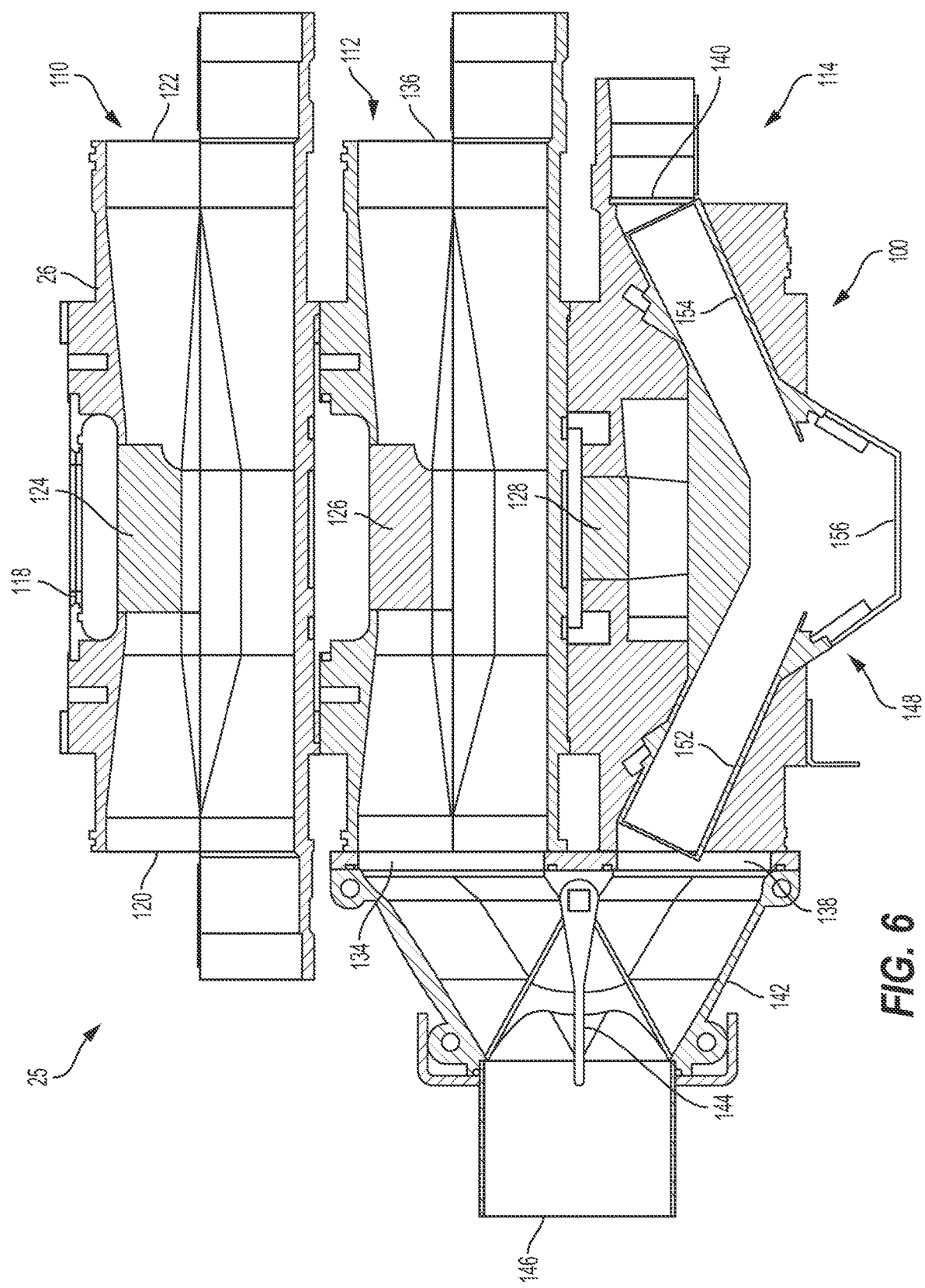
FIG. 6 is a cross-sectional side view through the manifold of FIG. 5.
Figure 7:
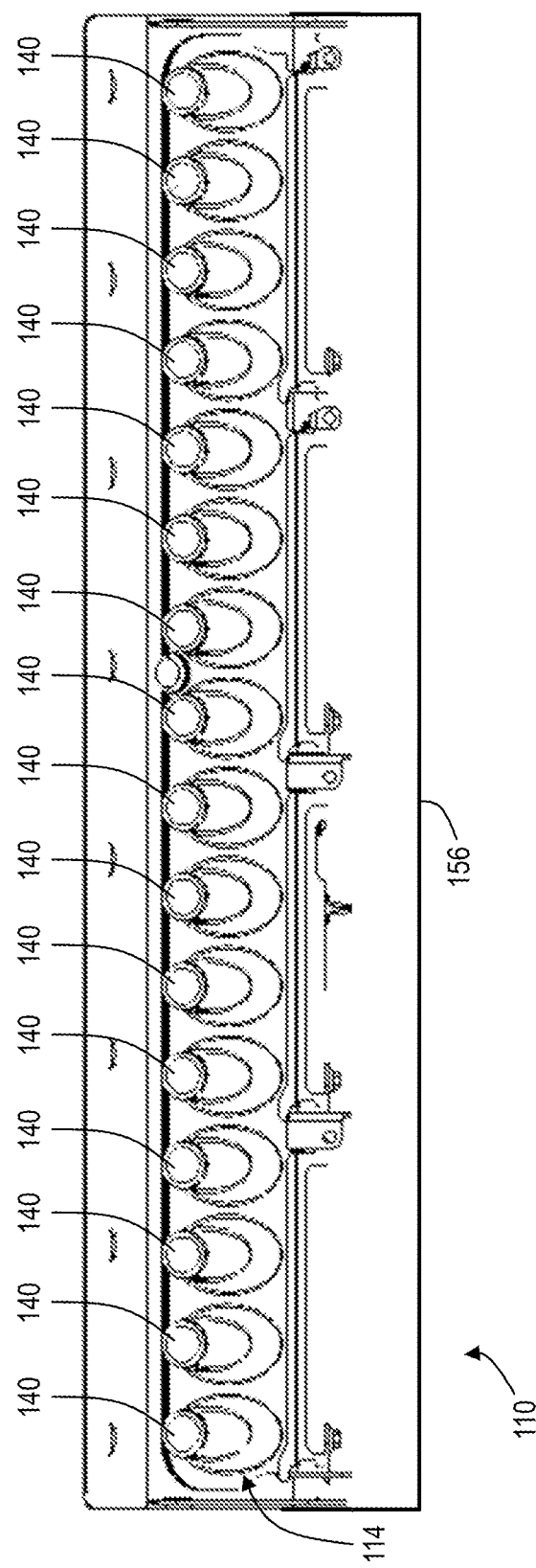
FIG. 7 is a side view of a lower shoot of the manifold of FIG. 6.

FIGS. 5-7 illustrate an alternative seed-on-demand distribution system 100. In this embodiment, the manifold 25, and specifically the manifold housing 26 is provided with the seed-on demand distribution system 100. FIG. 5 illustrates an embodiment where only a single manifold 25 is provided with a seed-on-demand distribution system 100. In other embodiments, the system shown in FIGS. 5-7 could be implemented on a seeding system having seed-on-demand distribution systems 100 in each manifold.

With reference to FIG. 6, the manifold housing 26 of the second commodity tank 18B includes an upper shoot channel 110 (associated with the first shoot 45), a middle shoot channel 112 (associated with the second shoot 49), and a lower shoot channel 114 (associated with the third shoot 53). The upper shoot channel 110 includes an air inlet 120 and an air and commodity or manifold outlet 122. The upper shoot channel 110 is defined by the manifold housing 26 and extends between the air inlet 120 and the manifold outlet 122. Though referred to as an air inlet 120, the airflow entering the air inlet may further carry a commodity from an upstream commodity tank, such as the first tank 18A.

The upper shoot channel 110 further includes a commodity inlet 118 that selectively provides a commodity from the respective tank 18B and volumetric meter 14B positioned thereabove. The commodity inlet 118 is distinct from the air inlet 120. A gate 124 is movable between a plurality of positions to selectively provide the commodity from the commodity inlet 118 to the upper shoot channel 110 or to otherwise direct the commodity around and away from the upper shoot channel 110.

The middle shoot channel 112 includes an air inlet 134 and an air and commodity or manifold outlet 136. The middle shoot channel 112 is defined by the manifold housing and extends between the air inlet 134 and the manifold outlet 136. Similar to the air inlet 120 of the upper shoot channel 110, the airflow entering the air inlet 134 may further carry a commodity from an upstream commodity tank. A gate 126 may be integrally formed with the gate 124 of the upper shoot channel 110 and may be moveable with the gate 124. When the gate 124 directs the commodity away from the upper shoot channel 110, the gate 126 either directs the commodity to the middle shoot channel 112 or away from the middle shoot channel 112 and to the lower shoot channel 114.

The lower shoot channel 114 includes an air inlet 138 and an air and commodity or manifold outlet 140. The lower shoot channel 114 is defined by the manifold housing and extends between the air inlet 138 and the manifold outlet 140. The lower shoot channel 114 is dissimilar from the upper and middle shoot channels 110, 112. The lower shoot channel 114 is a seed-on demand distribution system 100 similar to the distribution system 72 described with reference to FIGS. 3-4, though positioned within the manifold housing 26 as the lower shoot channel 114. Therefore, the lower shoot channel 114 is not merely a hollow tube extending between the air inlet 138 and the manifold outlet 140 but instead includes a tubular inlet portion or first portion 152 that extends at a downward angle (i.e., in the gravitational direction) from the air inlet 138 toward a bowl or container 156 that collects seeds flowing down from the commodity inlet 138 at the top of the manifold housing 26, bypassing the upper and middle shoot channels 110, 112. A tubular outlet portion or second portion 154 extends at an upward angle (i.e., opposite the downward direction) from the bowl 156 to the manifold outlet 140.

When the gates 124, 126 direct the commodity away from the upper shoot channel 110 and middle shoot channel 112, the gate 128 directs the commodity to the lower shoot channel 114. The gate 128 may be integrally formed with one or both of the first and second gates 124, 126. For example, the gates 124, 126, 128 may collectively transition between three positions: a first position in which the commodity is directed to the upper shoot channel 110, a second position in which the commodity is directed to the middle shoot channel 112, and a third position in which the commodity is directed to the lower shoot channel 114.

FIG. 7 illustrates a side view of the lower shoot 114 of the manifold housing 26. Each shoot 110, 112, 114 includes multiple inlets 120, 134, 138 and outlets 122, 136, 140 and this is illustrated via the lower shoot 114, which, as shown, includes sixteen outlets 140, each outlet leading to its own primary conduit 53. The system illustrated in FIG. 5 only illustrates a single one of the primary conduits 53 and the system associated therewith.

A valve 142 is positioned at the air inlets 134, 138 of the middle and lower shoot channels 112, 114. The valve 142 includes an inlet 146 for receiving an airflow from the fan 37B. A first outlet connects to the air inlet 134 of the middle shoot 112 and a second outlet connects to the air inlet 138 of the lower shoot 114. The valve 142 includes a valve member 144 that is switchable between a first position and a second position. In the first position, the valve member 144 blocks the inlet 138 of the lower shoot 114 such that the airflow generated by the fan 37B is directed to the middle shoot 112. In the second position, the valve member 144 blocks the inlet 134 of the middle shoot 112 such that the airflow generated by the fan 37B is directed to the lower shoot 114. Therefore, the valve member 144 is placed in the first position when volumetric metering only is desired. When it is desirable to also singulate the seeds from the commodity tank 18B positioned above the manifold 25, the valve member 144 is placed in the second position. The valve member 144 may also have a third (neutral) position in which airflow is directed to both the middle and lower shoot channels 112, 114.

When the seed is directed to the lower shoot channel 114, from the commodity tank 18B, through the volumetric meter 14B and commodity inlet 118, and through the various gates 124, 126, 128, it is carried to the mini-hoppers 38 based on the pressure within the third primary line 53 as discussed above with respect to the seed-on-demand system 72.

Various features of the disclosure are set forth in the following claims.

What is claimed is:

1. An air distribution manifold for dispensing a commodity into an airstream, the air distribution manifold comprising:
    a manifold housing defining a commodity inlet;
    a first shoot having a first air inlet, a first manifold outlet and a first passageway extending therebetween; and
    a second shoot having a second air inlet, a second manifold outlet and a second passageway extending therebetween,
    wherein the second passageway includes a container configured to hold the commodity, a first portion extending downward from the second air inlet to the container and a second portion extending upward from the container to the second manifold outlet.

2. The air distribution manifold of claim 1, further comprising a valve positioned at the first and second air inlets, the valve configured to direct an airflow to the first air inlet in a first position and to the second air inlet in a second position.

3. The air distribution manifold of claim 1, further comprising a gate positioned between the first shoot and the second shoot to selectively permit a flow of the commodity from the commodity inlet to the second shoot.

4. The air distribution manifold of claim 3, wherein the gate is a first gate, the air distribution manifold further comprising a second gate positioned above the first shoot and the second shoot to selectively permit a flow of the commodity from the commodity inlet to the first shoot.

5. The air distribution manifold of claim 1, wherein the first passageway extends linearly from the first air inlet to the first manifold outlet.

6. The air distribution manifold of claim 1, wherein the commodity inlet directs the commodity into the first passageway substantially perpendicular to a longitudinal axis of the first passageway.

7. The air distribution manifold of claim 1, further comprising a third shoot having a third air inlet, a third manifold outlet and a third passageway extending therebetween, wherein the third shoot is located above the first shoot and the second shoot.

8. The air distribution manifold of claim 7, further comprising a valve positioned at the first and second air inlets, the valve configured to direct an airflow to the first air inlet in a first position and to the second air inlet in a second position, wherein the third air inlet is configured to receive an airflow regardless of a position of the valve.

9. The air distribution manifold of claim 1, wherein the container is positioned below the commodity inlet such that the commodity is configured to fall via gravity from the commodity inlet into the container.

10. The air distribution manifold of claim 1, wherein a diameter of the second air inlet is less than a diameter of the first air inlet and a diameter of the second manifold outlet is less than a diameter of the first manifold outlet.

11. The air distribution manifold of claim 1, wherein the first portion of the second passageway decreases in diameter from the air inlet to the container and the second portion of the second passageway increases in diameter from the container to the second manifold outlet.

12. The air distribution manifold of claim 1, further comprising a first gate positioned between the first shoot and the second shoot and movable between an open position and a closed position, and a second gate positioned between the commodity inlet and the first shoot and movable between an open position and a closed position.

13. The air distribution manifold of claim 1, wherein the second shoot is a lowermost shoot of the air distribution manifold.

14. An air distribution manifold for dispensing a commodity into an airstream, the air distribution manifold comprising:
    a manifold housing defining a commodity inlet;
    a first shoot having a first air inlet, a first manifold outlet and a first passageway extending therebetween;
    a second shoot having a second air inlet, a second manifold outlet and a second passageway extending therebetween; and
    a valve configured to direct an airflow to the first air inlet, to the second air inlet, or to both of the first air inlet and the second air inlet;
    wherein the second passageway includes a container configured to hold the commodity, a first portion extending from the second air inlet to the container and a second portion extending from the container to the second manifold outlet.

15. The air distribution manifold of claim 14, further comprising a gate positioned between the first shoot and the second shoot to selectively permit a flow of the commodity from the commodity inlet to the second shoot.

16. The air distribution manifold of claim 14, further comprising a third shoot having a third air inlet, a third manifold outlet and a third passageway extending therebetween, wherein the third shoot is located above the first shoot and the second shoot.

17. The air distribution manifold of claim 14, wherein the first portion of the second passageway extends transverse to the second portion of the second passageway.

18. An air distribution manifold for dispensing a commodity into an airstream, the air distribution manifold comprising:
    a manifold housing defining a commodity inlet;
    a first shoot having a first air inlet, a first manifold outlet and a first passageway extending therebetween, wherein the first passageway is a linear passageway;
    a second shoot having a second air inlet, a second manifold outlet and a second passageway extending therebetween, wherein the second passageway is a V-shaped passageway having a first portion extending downward from the second air inlet and a second portion extending upward to the second manifold outlet.

19. The air distribution manifold of claim 18, further comprising a container positioned within the second shoot and configured to store the commodity.

20. The air distribution manifold of claim 18, wherein the commodity inlet directs the commodity into the first passageway substantially perpendicular to a longitudinal axis of the first passageway.

* * * * *